US012670134B2

(12) United States Patent
Boué et al.

(10) Patent No.: US 12,670,134 B2
(45) Date of Patent: Jun. 30, 2026

(54) APPROXIMATE QUERY EQUIVALENCE FOR FEATURE STORES IN MACHINE LEARNING OPERATIONS PRODUCTS

(71) Applicant: Microsoft Technology Licensing, LLC, Redmond, WA (US)

(72) Inventors: Laurent Boué, Petah Tikva (IL); Kiran Rama, Bangalore (IN); Vijay Srinivas Agneeswaran, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 3 days.

(21) Appl. No.: 18/733,129

(22) Filed: Jun. 4, 2024

(65) Prior Publication Data

US 2024/0320200 A1     Sep. 26, 2024

Related U.S. Application Data

(63) Continuation of application No. 17/863,853, filed on Jul. 13, 2022, now Pat. No. 12,038,891.

(51) Int. Cl.
| | |
|---|---|
| *G06F 16/215* | (2019.01) |
| *G06F 16/242* | (2019.01) |
| *G06F 16/25* | (2019.01) |

(52) U.S. Cl.
CPC .......... *G06F 16/215* (2019.01); *G06F 16/243* (2019.01); *G06F 16/254* (2019.01)

(58) Field of Classification Search
CPC ..... G06F 16/215; G06F 16/243; G06F 16/254
See application file for complete search history.

(56) References Cited

U.S. PATENT DOCUMENTS

2017/0308592 A1 * 10/2017 Agrawal ............... G06F 16/285
2021/0081434 A1 * 3/2021 Dombroski ........... G06F 16/282

* cited by examiner

*Primary Examiner* — Hau H Hoang
(74) *Attorney, Agent, or Firm* — Weaver IP L.L.C.

(57) ABSTRACT

Methods, systems, apparatuses, and computer-readable storage mediums are descried for identifying a similarity between queries. An intermediate representation generator receives a set of queries from a repository, each query in the set of queries having generated a corresponding set of data stored in a data store. An intermediate representation is generated for each query, where the intermediate representation is characterized by a feature associated with text specified in the query. A similarity determiner determines similarity scores between pairs of intermediate representations. A pair of intermediate representations with a similarity score above a threshold is identified. An indication is generated that sets of data corresponding to queries corresponding to the intermediate representations are overlapping.

20 Claims, 6 Drawing Sheets

<u>200</u>

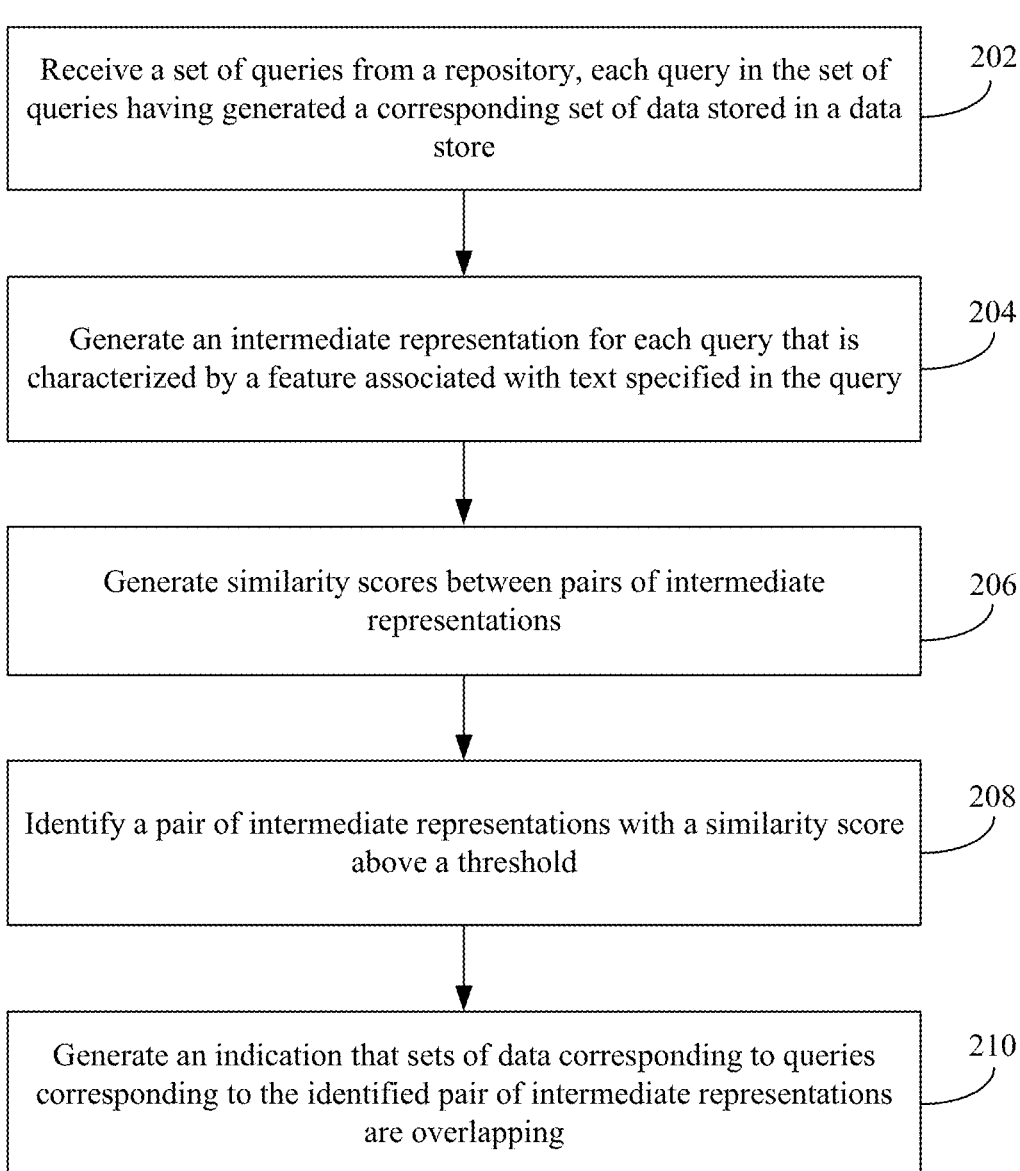

Receive a set of queries from a repository, each query in the set of queries having generated a corresponding set of data stored in a data store    202

Generate an intermediate representation for each query that is characterized by a feature associated with text specified in the query    204

Generate similarity scores between pairs of intermediate representations    206

Identify a pair of intermediate representations with a similarity score above a threshold    208

Generate an indication that sets of data corresponding to queries corresponding to the identified pair of intermediate representations are overlapping    210

| $q_1$ | $q_2$ | $s(Q_1, Q_2)$ |
|-------|-------|---------------|
|       |       |               |
|       |       |               |
|       |       |               |
|       |       |               |
|       |       |               |

FIG. 6

APPROXIMATE QUERY EQUIVALENCE FOR FEATURE STORES IN MACHINE LEARNING OPERATIONS PRODUCTS

CROSS-REFERENCE TO RELATED APPLICATIONS

This application is a continuation of U.S. patent application Ser. No. 17/863,853, filed Jul. 13, 2022, entitled "Approximate Query Equivalence for Feature Stores in Machine Learning Operations Products," the entirety of which is incorporated by reference herein.

BACKGROUND

Data deduplication techniques have been long employed in information technology (IT) organizations as a way to reduce the costs associated with the storage or transfer of large amounts of data. Data deduplication typically comprises partitioning data into smaller chunks of data that are compared against each other via hash functions. If two chunks $c_i$ and $c_j$ are such that $h(c_j)=h(c_j)$ for a generic hash function h, then it is inferred that $c_i$ and $c_j$ are identical and one chunk can be replaced by a pointer to the other chunk. Although many strategies have been proposed for choosing an appropriate chunk size and selecting a hashing mechanism, deduplication remains a resource-intensive activity since processing systems need to continuously scan file systems or databases to look for data matches. These techniques implement read access to the actual data, as the techniques are dependent on the data itself. The access to data may introduce additional sources of complexity when trying to deduplicate data across different permission boundaries.

With increased machine learning (ML) workloads, data scientists construct features that are used to generate data sets. Such data sets, which can comprise large amounts of data, are then stored in a feature store that is shared across different users. As feature stores are being used more commonly, the likelihood of different data scientists constructing the same or similar features increases, resulting in an increased amount of duplicate data stored in the features stores.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for identifying a similarity between queries. An intermediate representation generator receives a set of queries from a repository, each query in the set of queries having generated a corresponding set of data stored in a data store. An intermediate representation is generated for each query, where the intermediate representation is characterized by a feature associated with text specified in the query. A similarity determiner determines similarity scores between pairs of intermediate representations. A pair of intermediate representations with a similarity score above a threshold is identified. An indication is generated that sets of data corresponding to queries corresponding to the intermediate representations are overlapping.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2 shows a flowchart of a method for identifying a similarity between queries, in accordance with an example embodiment.

FIG. 6 shows an illustrative table depicting similarity scores associated with pairs of queries, in accordance with an example embodiment.

Figure 1:
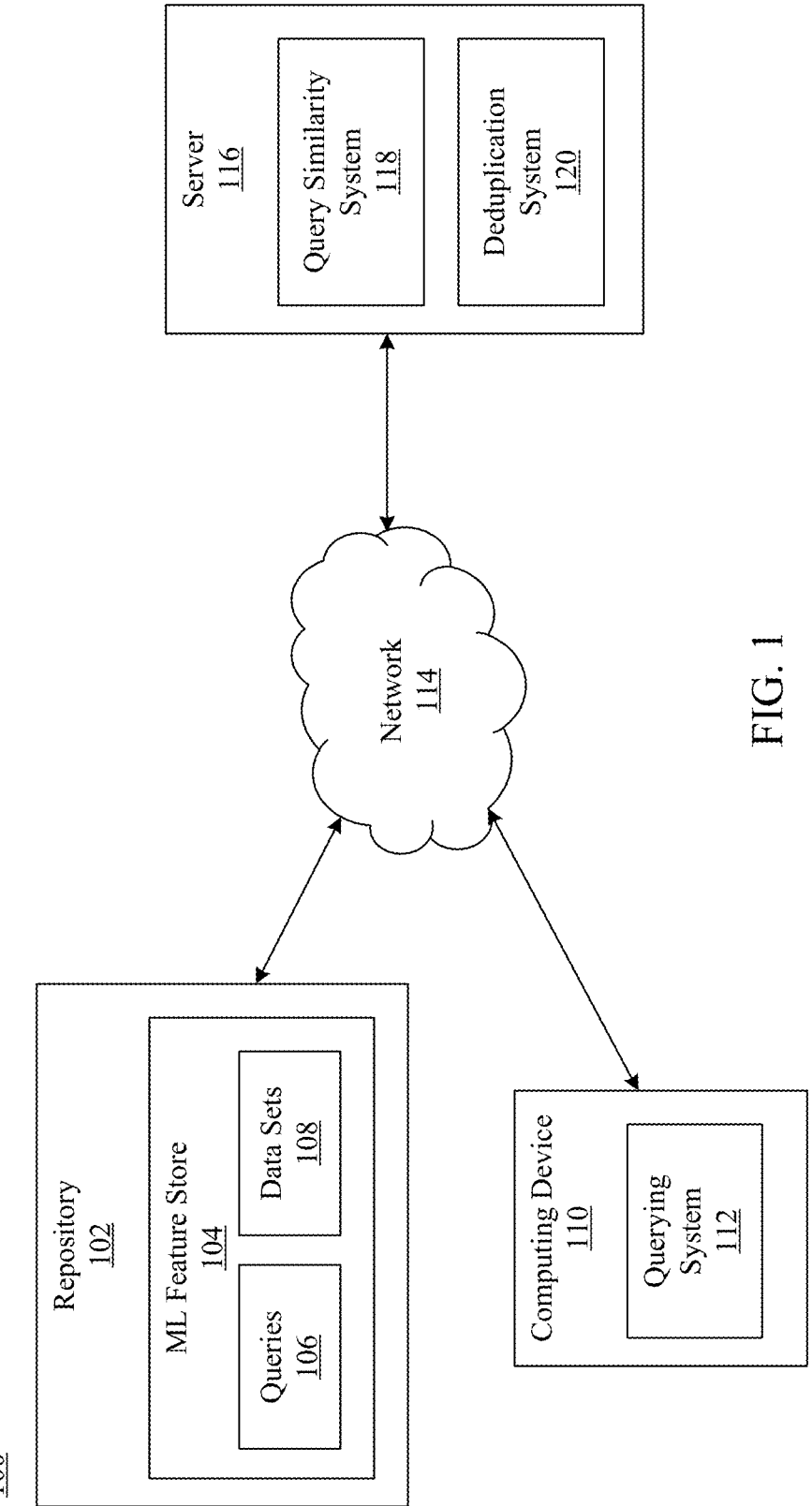
FIG. 1 shows a block diagram of a system for identifying similar queries, in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on." If the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Data deduplication techniques have been long employed in information technology (IT) organizations as a way to reduce the costs associated with the storage or transfer of large amounts of data. Data deduplication typically comprises partitioning data into smaller chunks of data that are compared against each other via hash functions. If two chunks $c_i$ and $c_j$ are such that $h(c_i)=h(c_j)$ for a generic hash function h, then it is inferred that $c_i$ and $c_j$ are identical and one chunk can be replaced by a pointer to the other chunk. Although many strategies have been proposed for choosing an appropriate chunk size and selecting a hashing mechanism, deduplication remains a resource-intensive activity since processing systems need to continuously scan file systems or databases to look for data matches. These techniques require read access to the actual data, as the techniques are dependent on the data itself. In some instances, the access to data also introduces an additional source of complexity when trying to deduplicate data across different permission boundaries.

With increases in machine learning (ML) workloads, data scientists construct features that are used to generate data sets. Such data sets, which can comprise large amounts of data, are then stored in a feature store that is shared across different users. As feature stores are being used more commonly, the likelihood of different data scientists constructing the same or similar features increases, resulting in an increased amount of duplicate data stored in the features stores.

In some instances, data duplication is accentuated in the ML or data science context due to the larger data sizes involved in such projects. As noted above, data scientists or engineers construct features, which can include numerical or categorical records of data, that are combined together to form datasets during development of ML models. These features can be constructed by writing queries to databases in the form of source code in a query language to extract, transform and/or load (ETL) data. Once the queries are executed, the data sets are materialized and stored. These datasets that are produced by executing queries may be extremely large in many instances, as they contain the actual data itself (or data generated therefrom).

It has become increasingly common for organizations to invest in ML feature stores where users can build, manage, and share new datasets quickly and reliably. In many implementations, a feature stores abstracts away the engineering layers to provide easier access for users to read and write new features into a centralized repository. As feature stores have become utilized more in ML techniques, feature stores are also the place where data duplication issues may become more acute. For instance, different teams within the same organization may develop similar solutions because they are unaware of each other's tasks, resulting in data duplication and reduced efficiency for the feature stores.

Techniques described herein address these and other issues by providing methods, systems, apparatuses, and computer-readable storage mediums for identifying a similarity between queries. In an example system, an intermediate representation generator receives a set of queries from a repository, each query in the set of queries having generated a corresponding set of data stored in a data store. An intermediate representation is generated for each query, where the intermediate representation is characterized by a feature associated with text specified in the query. A similarity determiner determines similarity scores between pairs of intermediate representations. A pair of intermediate representations with a similarity score above a threshold is identified. An indication is generated that sets of data corresponding to queries corresponding to the intermediate representations are overlapping.

Identifying a similarity between queries as described herein has numerous advantages, including but not limited to reducing the consumption of processing and storage resources. For example, techniques described herein enable identification of queries that are similar based on analyzing text in the query. If a pair of queries are identified that have a similarity score above a threshold, it can be determined that the data sets corresponding to those queries are overlapping (e.g., have duplicated data). In this manner, potentially duplicated data may be identified without having to perform resource-intensive analyses with respect to the underlying data. In other words, techniques described herein may identify such duplicated data based on analyzing text in the queries used to generate the data, in contrast to other techniques which compare chunks of the actual data. As a result, potentially duplicated data can be identified using far less processing resources.

In addition, identifying potentially duplicated data in the above matter may reduce the amount of data stored on computing devices. For instance, by identifying which queries (and corresponding data sets generated by executing those queries) are similar, overlapping data may be efficiently identified and deduplicated, resulting in a reduction of utilized storage resources.

Still further, techniques described herein may also enable improvements in the security of computing devices and data stored thereon. For example, since techniques described herein may allow for identifying potentially duplicated data based on analysis of the queries used to generate data sets (rather than the data sets themselves), access permissions for the data sets need not be created for the system identifying the duplicated data, thereby reducing the risk of a security breach or other unintended access of data. Rather, the system need only be provided with access to the queries that were used to generate the data sets, resulting in a reduced exposure of data.

As such, example embodiments are described herein directed to techniques for identifying similar queries in computing environments. For instance, FIG. 1 shows a block diagram of a system 100 for identifying similar queries, in accordance with an example embodiment. As shown in FIG. 1, system 100 includes a repository 102, a computing device 110, and a server 116. Repository 102 includes a machine learning (ML) feature store 104. ML feature store 104 includes a set of queries 106 and data sets 108. Computing device 110 includes a querying system 112. Server 116 includes a query similarity system 118 and a deduplication system 120. Repository 102, computing device 110, and server 116 may be communicatively coupled by a network 114. An example computing device that may incorporate the functionality of repository 102, computing device 110, and server 116 (or any subcomponents therein, whether or not illustrated in FIG. 1) is described below in reference to FIG. 7. It is noted that system 100 may comprise any number of devices, including those illustrated in FIG. 1 and optionally one or more further devices or components not expressly illustrated. System 100 is further described as follows.

Network 114 may include one or more of any of a local area network (LAN), a wide area network (WAN), a personal area network (PAN), a combination of communication networks, such as the Internet, and/or a virtual network. In example implementations, repository 102, computing device 110, and server 116 communicate via network 114. In an implementation, any one or more of repository 102, computing device 110, and server 116 may communicate over network 114 via one or more application programming interfaces (API) and/or according to other interfaces and/or techniques. Repository 102, computing device 110, and server 116 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Repository 102 comprises a storage for storing information associated with query executions. Repository 102 may comprise any type of storage unit, including but not limited to a memory or storage device (e.g., physical storage devices, local storage devices, cloud-based storages, disks, hard disk drives, solid state devices (SSDs), random access memory (RAM) devices, etc.), computing devices containing such memory or storage devices, or a collection thereof. In implementations, repository 102 may be configured to store information associated with execution of queries against a database system (not shown), but implementations are not so limited. Repository 102 may store information associated with any type of execution of code, where the execution of code results in generation of a set of associated data.

ML feature store 104 comprises a store for storing ML features in an implementation. An ML feature stored in ML feature store 104 may comprise a query executed against a data source and/or a corresponding data set generated in response to execution of the query. In examples, ML feature store 104 may contain queries 106 that comprise a history of previously executed queries, and data sets 108 corresponding to each query in the set of queries 106. Queries 106 may be constructed (e.g., defined) in various ways, such as by data scientists, engineers, or other users, to generate desired data sets 108. Queries 106 may be constructed in any one or more languages, including SQL, Presto, Azure Synapse, and/or other language as appreciated by those skilled in the relevant arts. Upon execution of each of queries 106, corresponding data sets 108 are materialized and stored in ML feature store 104. Queries 108 may comprise text-based files that store the code or language used to generate data sets 108 and may not contain data generated upon execution of the queries. Data sets 108, on the other hand, may comprise numerical or categorical records of data based on execution of queries (e.g., data aggregating the age or locations of users). In some examples, each set of data in data sets 108 comprise machine-learning features (e.g., features generated by executing a query that may be used during the training, deployment, maintenance, etc. of ML models).

As a non-limiting illustration, ML feature store may comprise a table of rows and columns, where the row identifies a person and a column identifies a corresponding age, height, gender, zip code, or any other information obtained by querying a data source (not shown). In some scenarios, features may be defined by aggregations or combinations of data stored in a data source (e.g., age*height). Such columns may define the features that engineers may use for training and/or deployment of ML models used for various applications.

In implementations, ML feature store 104 may be shared across users of an organization or multiple organizations, such that users can share and/or access datasets 108 that may be used for various ML solutions and/or other purposes. For instance, ML feature store 104 may comprise tools for enabling a search of features stored therein, such that an engineer in one team may locate and use features generated by a different engineer from another team. However, since different engineers can write the same or similar queries for features stored in ML feature store 104, ML feature store 104 may contain overlapping or duplicated information (e.g., data sets that have the same or similar information) in some instances.

Computing device 110 includes any number of one or more computing devices of one or more users (e.g., individual users, family users, enterprise users, governmental users, etc.) that each comprise one or more applications, operating systems, virtual machines, storage devices, etc. that may be used to access ML feature store 104. Computing device 110 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Computing device 110 is not limited to a physical machine, but may include other types of machines or nodes, such as a virtual machine. Computing device 110 may interface with other components illustrated in FIG. 1 through APIs and/or by other mechanisms.

Querying system 112 comprises an interface through which users may define queries 106 for execution against a data source to generate data sets 108 (e.g., features) and/or access queries 106 or data sets 108 that were previously generated. Querying system 112 may comprise a web-based interface, an application, or any other type of interface for generating queries 106 and/or accessing any information stored in ML feature store 104, accessing information and/or presenting information associated with resources 112. Querying system 112 may present information from ML feature store 104 in textual form, graphs, charts, images, videos, or any other manner as will be appreciated to those skilled in the relevant arts. In some further implementations, computing device 110 may also comprise one or more tools for generation, management, training, and/or deployment of ML models or other ML operations products that utilize features stored in ML feature store 104.

Server 116 comprises any number of devices, such as a network-accessible server (e.g., a cloud computing server network) that may comprise software or a service for managing ML feature store 104. As described in greater detail below, such management may include, but is not limited to, identifying queries 106 that are the same or similar to each other and deduplicating data sets 108 based on such identification. In some examples, such a software or service may be provided as a cloud service. Server 116 may comprise a group or collection of servers (e.g., computing devices) that are each accessible by a network such as the Internet (e.g., in a "cloud-based" embodiment). In example embodiments, server 116 is a computing device that is located remotely (e.g., in a different facility) from repository 102 and/or computing device 110, and communicatively coupled thereto via network 114. Server 116 may comprise any number of computing devices, and may include any type and number of other resources, including resources that facilitate communications with and between servers, storage by the servers, etc. (e.g., network switches, storage devices, networks, etc.). In an embodiment, devices of server 110 may be co-located (e.g., housed in one or more nearby buildings with associated components such as backup power supplies, redundant data communications, environmental controls, etc.) to form a datacenter, or may be arranged in other manners. Accordingly, in an embodiment, server 116 may be a datacenter in a distributed collection of datacenters.

Query similarity system 118 is configured to identify any of queries 106 that are the same or similar (e.g., have a similarity score above a threshold), such that it data sets 108 that are potentially overlapping may be identified and/or deduplicated. For instance, if two queries are the same or similar, query similarity system 118 may infer that data sets 108 (e.g., features) generated therefrom are at least similar to each other and therefore potential candidates for deduplication.

As will be discussed in greater detail below, query similarity system 118 may operate in various ways. In one example, query similarity system 118 receives queries 106 queries from repository 102, where each query was previously executed to generate a corresponding data set stored in ML feature store 104. An intermediate representation may be generated for each query, where the intermediate representation is characterized by a feature associated with text specified in the query (e.g., a keyword, a function, or a data source). Similarity scores between pairs of intermediate representations are determined, and a pair of intermediate representations with a similarity score above a threshold is identified. Based on the identified pair of intermediate representations with the similarity score above a threshold, an indication may be generated that data sets corresponding to the queries associated with the intermediate representations are overlapping (e.g., may contain duplicate data). In this manner, overlapping data sets may be identified based on analysis of the query, rather than analysis of the underlying data sets. Query similarity system 118 will be described in greater detail below.

Deduplication system 120 may comprise any software or service for analyzing data sets 108 (or a subset thereof) to identify and/or remove data sets that are duplicates or otherwise contain redundant information. In some implementations, deduplication system 120 may utilize hashing functions to identify identical chunks of data for potential removal. This is only one example, and deduplication system 120 may implement any other suitable functionality to identify and/or remove duplicate data in ML feature store 104. In some implementations, deduplication system 120 may receive a signal from query similarity system 118 that identifies a subset of data sets 108 (e.g., data sets that are identified as overlapping, as described herein) for which a deduplication algorithm should be executed. In this manner, rather than executing a deduplication algorithm across all data sets stored in ML feature store 104, which can consume excessive computing resources, data duplication system 120 may be configured to execute the deduplication algorithm on a subset of data sets that are identified as most likely containing duplicated information, thereby conserving system resources.

Implementations are not limited to the illustrative arrangement shown in FIG. 1. For instance, repository 102, computing device 110, and/or server 116 not be separate or located remote from each other. In some examples, any one or more of repository 102, computing device 110, and/or server 116 (or any subcomponents therein) may be located in or accessible via the same computing device or distributed across a plurality of devices. For instance, techniques described herein may be implemented in a single computing device. Furthermore, it is understood that although query similarity system 118 and deduplication system 120 are shown as being implemented within server 116, such components may be located in any other location or computing device (or collection of computing devices), and need not be co-located with or implemented in the same computing device. Furthermore, system 100 may comprise any number of other storage devices, networks, servers, and/or computing devices coupled in any manner.

Query similarity system 118 may operate in various ways to identify similar queries in a computing environment. For instance, query similarity system 118 may operate according to FIG. 2. FIG. 2 shows a flowchart 200 of a method for identifying a similarity between queries, in accordance with an example embodiment. For illustrative purposes, flowchart 200 and query similarity system 118 are described as follows with respect to FIG. 3. While example embodiments are described with respect to flowchart 200 and components of system 300, these examples are illustrative.

Figure 3:
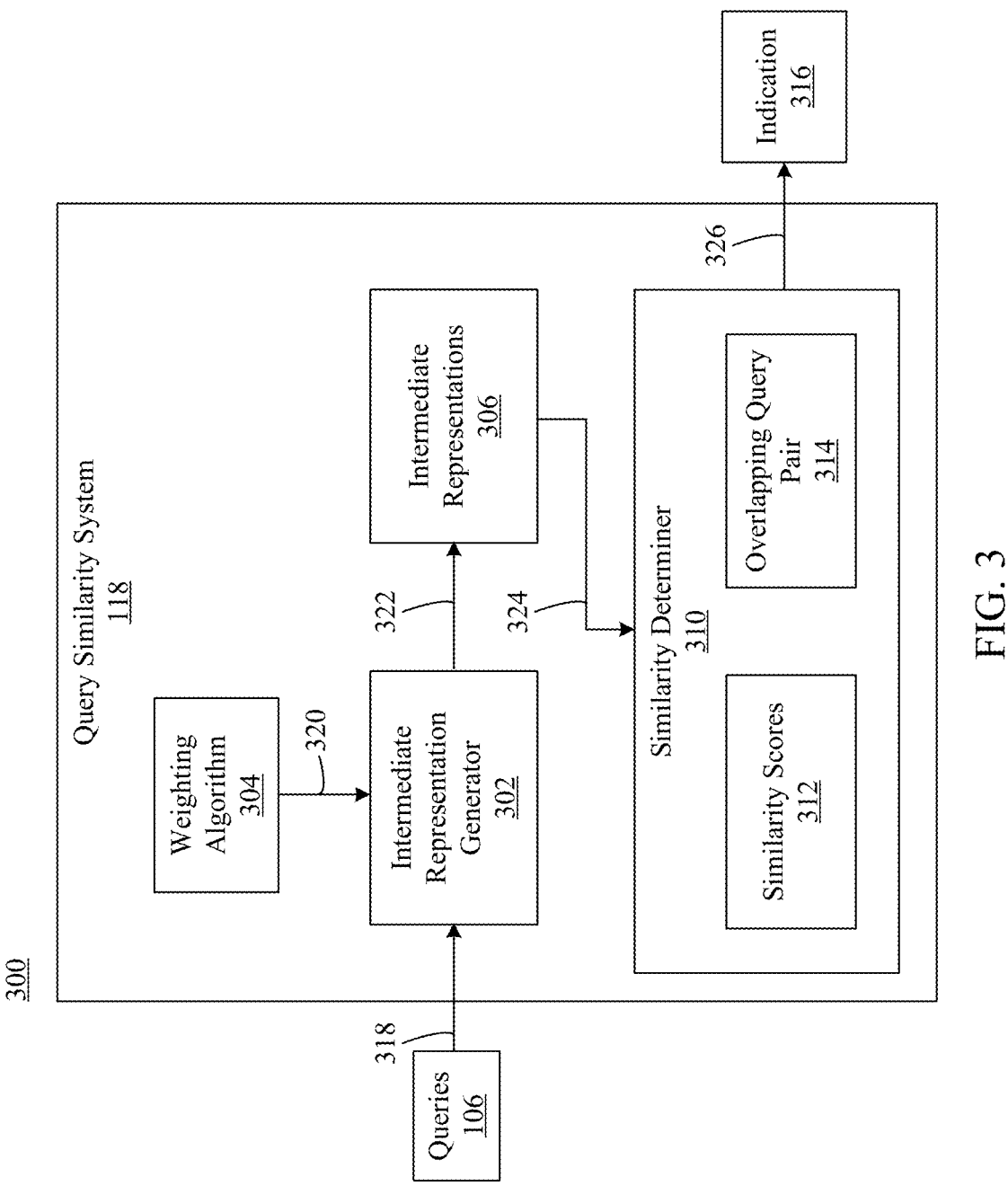
FIG. 3 shows a block diagram of a system for identifying a similarity between queries, in accordance with an example embodiment.

FIG. 3 shows a block diagram of a system 300 for identifying a similarity between queries, in accordance with an example embodiment. As shown in FIG. 3, system 300 includes an example implementation of queries 106, an example implementation of query similarity system 118, and an indication 316. As shown in FIG. 3, query similarity system 118 may receive queries 106 and output indication 316 based on the received queries. Query similarity system 118 comprises an intermediate representation generator 302, a weighting algorithm 304, a set of intermediate representations 306, and a similarity determiner 310. Similarity determiner 310 comprises a set of similarity scores 312 and an overlapping query pair 314. Flowchart 200 and system 300 are described in further detail as follows.

Flowchart 200 begins with step 202. In step 202, a set of queries is received from a repository, each query in the set of queries having generated a corresponding set of data stored in a data store. For instance, with reference to FIG. 3, intermediate representation generator 302 is configured to receive 318 queries 106 from repository 102. As discussed herein, each query in the set of queries 106 have been executed to generate a corresponding set of data (i.e., data sets 108) stored in ML feature store 104. For instance, each query of queries 106 may comprise code written in a programming language (e.g., SQL) that was previously executed and used to obtain data from a data source to generate features (e.g., ML features), which may be stored as a corresponding data set.

Queries 106 obtained by intermediate representation generator 306 may comprise a file (e.g., a text file) or a collection of files (e.g., a set of text files) that comprise the text that defines each query. For instance, the files obtained by intermediate representation generator 302 may identify keywords, functions, data sources, statements, tables, columns, operators, etc. that have been defined (e.g., using querying system 112) to generate data sets. In implementations, intermediate representation generator 302 need not obtain data sets 108 that contain data generated upon execution of each query. Rather, the original or raw text of the queries (e.g., the precise character description of the queries) previously executed to generate such data sets are obtained by intermediate representation generator 302 in accordance with disclosed techniques.

In step 204, an intermediate representation is generated for each query that is characterized by a feature associated with text specified in the query. For instance, with reference to FIG. 3, intermediate representation generator 302 is configured to generate an intermediate representation for each query of queries 106, where the intermediate representation is characterized by a feature associated with text specified in the query. Intermediate representation generator 302 may generate an intermediate representation for each query to generate 322 a set of intermediate representations 306. In implementations, the intermediate representation for each query may comprise a multi-dimensional vector, where each dimension corresponds to a different feature associated with text specified in the query.

For example, the feature specified in the query may be based on any one or more keywords, functions, data sources, statements, tables, columns, operators, etc. present in the text of queries 106 that were previously executed. In implementations, the intermediate representation for each query may represent a grammatical structure of the query by extracting different textual parts of the query, generating a feature for each part, and generating an intermediate representation thereof. In this manner, an intermediate representation of each query may be generated that comprises a higher-level representation of the query based on the text thereof. Thus, rather than comparing each query at a character-by-character level (which may result in only exactly the same queries being identified), lifting the query to a higher-level intermediate representation may allow for comparisons to be performed at a higher level. Implementations are not limited to the disclosed illustrations, but may also include other techniques for generating an intermediate representation (e.g., a higher-level representation) of each query that abstracts away syntax specific details.

In some implementations, intermediate representation generator 302 may be configured to apply 320 weighting 304 (and/or additional weighting algorithms not expressly shown) to transform each intermediate representation into a weighted intermediate representation. For instance, the weighted intermediate representation may comprise a vector with the same number of dimensions as the initial intermediate representation, but each component of the vector may comprise a weight associated therewith. Each weight may indicate, for instance, a value indicative of an importance of each feature of the intermediate representation in terms of its predictive value. For instance, if there is a certain term that is used relatively infrequently across queries 106 but the presence of that term is identified in a given query, a feature associated with that term in the query may be given a higher weight. Conversely, if a term appears frequently across queries 106, the presence of that term in a given query may be assigned a lower weight. Each component of the intermediate representation can be weighted in such a manner to generate a weighted intermediate representation. Any number of weighting algorithms may be used by intermediate representation generator 302 to generate weighted intermediate representations. In one implementation, weighting algorithm 304 may comprise a Term Frequency-Inverse Document Frequency (TF-IDF) algorithm to weight components of the intermediate representation. This example is illustrative only, and other weighting algorithms may also be applied to weight components of the intermediate representation generated by intermediate representation generator 302 as appreciated by those skilled in the relevant arts. In this manner, the vector representation (e.g., the intermediate representation) for each query may be characterized by a plurality of weighted features, where each weighted feature is associated with a different dimension (each dimension associated with text specified in the query, such as one dimension relating to keywords in the query, another dimension relating to functions in the query, another dimension relating to data sources in the query, etc.).

In step 206, similarity scores are generated between pairs of intermediate representations. For instance, with reference to FIG. 3, similarity determiner 310 is configured to obtain 324 intermediate representations 306 (each intermediate representation corresponding to a query of queries 106) and generate similarity scores 312 between pairs of the intermediate representations. The similarity score may be generated in various ways, including but not limited to, using a cosine similarity, Okapi BM25, Jaccard similarity index, MinHash, or other similar techniques as appreciated by those skilled in the art to quantitatively measure the similarity between two multi-dimensional representations (e.g., vectors). In some examples, the similarity score may be generated based on a combination of the foregoing techniques (or other techniques not expressly listed). In this manner, an approximation may be generated that indicates a level of similarity between each query of queries 106.

In step 208, a pair of intermediate representations with a similarity score above a threshold is identified. For instance, with reference to FIG. 3, similarity determiner 310 may identify similarity scores 312 that are above a threshold value, and for each similarity score above the threshold, identify the pair of intermediate representations corresponding to the similarity score (and the queries corresponding to those intermediate representations) as overlapping query pair 314 The threshold may be predetermined and/or configurable by a user or administrator (e.g., via querying system 112 or another interface not expressly illustrated). In implementations, the threshold value may represent a value above which two intermediate representations (and the queries associated therewith) are similar enough such that a potential overlap of data in data sets 108 exists. Accordingly, upon generating the similarity scores, various scores may be identified ranging from low to high (e.g., 0 to 1), where a low score represents a low likelihood of similarity and a high score represents a high likelihood of similarity. Similarity scores under the threshold may indicate that an overlap of data in data sets 108 corresponding to the pair of intermediate representations is not likely to be present, and therefore further deduplication algorithms with respect to those data sets are unlikely to result in a conservation of storage resources. Conversely, scores closer to the highest indicate that two queries are similar, or even identical, and therefore the corresponding data sets associated with each query may be similar or identical. For such data sets, deduplication algorithms may be carried out to remove duplicate data, thereby conserving resources. In this manner, similarity scores may be utilized to prioritize which data sets should be investigated for any further deduplication measures.

In step 210, an indication is generated that sets of data corresponding to queries corresponding to the identified pair of intermediate representations are overlapping. For instance, with reference to FIG. 3, similarity determiner 310 may generate 326 indication 316 that indicates that sets of data corresponding to overlapping query pair 314 are overlapping. In this manner, query similarity system 118 may be configured to identify overlapping (including potentially overlapping) data sets of data sets 108 without analyzing those data sets or executing queries associated with those data sets, thereby preserving computational resources typically utilized in deduplication techniques. Rather, in accordance with disclosed techniques, query similarity system 118 may identify similar queries and overlapping data sets based on text specified in queries, resulting in efficient identification of duplicated data.

Not only do conventional techniques utilize more resources in identifying duplicated data, but such techniques are typically based on identifying exact matches between duplicated data. For instance, if a single bit is different between two sets of data, the data may be identified as different and both data sets are preserved. In accordance with the disclosed techniques, an approximate equivalence between queries may be determined, which allows for the identification of similar data sets (even if not identical), thereby providing an enhanced technique for deduplication of data.

Figures 4, 5:
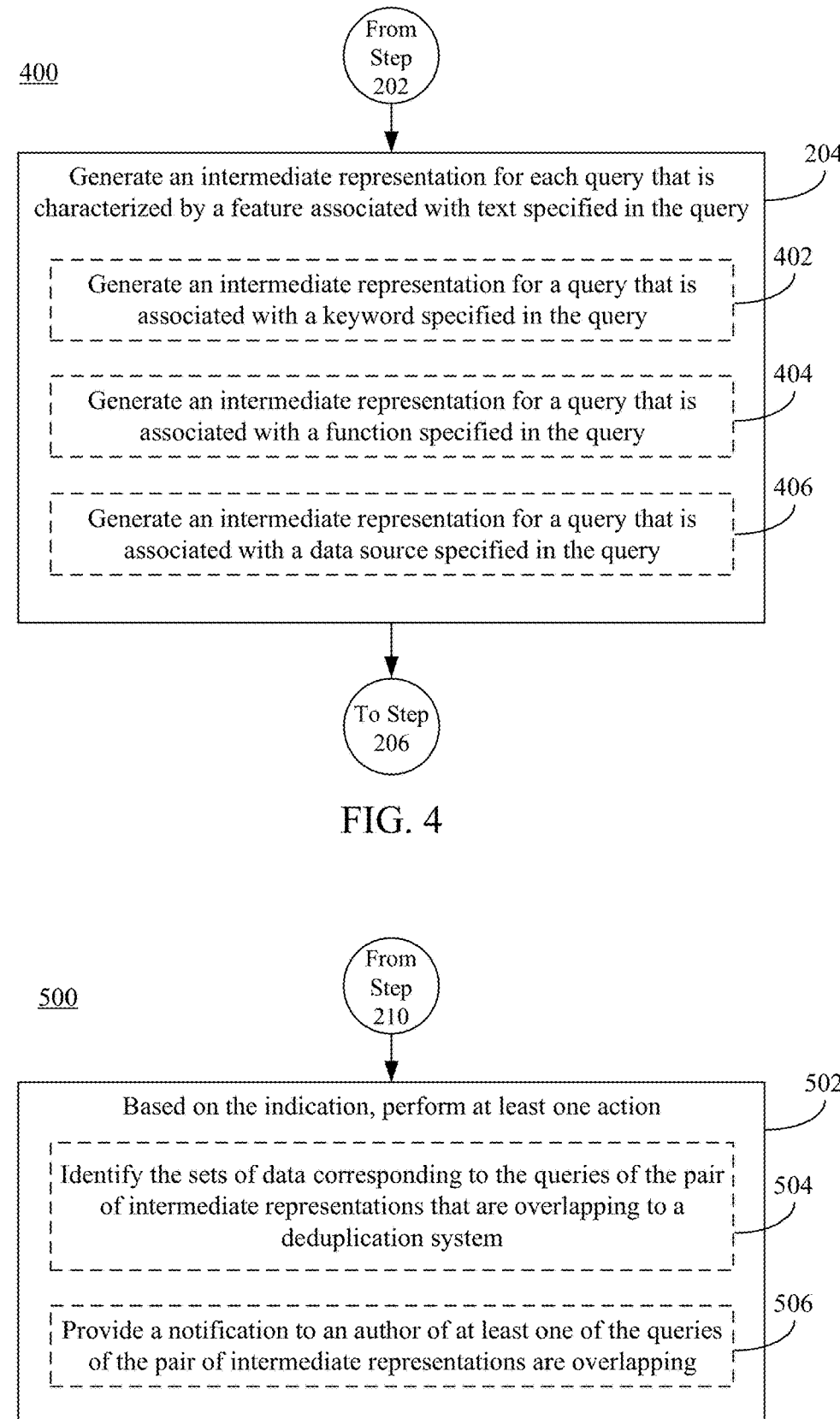
FIG. 4 shows a flowchart of a method for generating an intermediate representation for a query, in accordance with an example embodiment.
FIG. 5 shows a flowchart of a method for performing an action based on an indication of an overlapping data set, in accordance with an example embodiment.

Turning now to FIG. 4, a flowchart 400 of a method for generating an intermediate representation for a query is shown, in accordance with an example embodiment. System 100 in FIG. 1 and/or system 300 in FIG. 3, e.g., via query similarity system 118, operate according to flowchart 400, which may be an embodiment of flow diagram 200 of FIG. 2, e.g., step 204 of flowchart 200 as described in view of query similarity system 118. Further structural and operational examples will be apparent to persons skilled in the relevant art(s) based on the following descriptions.

Flowchart 400 includes a step 402, a step 404, and a step 406, and one or more of these steps may be optionally performed to execute step 204 of flowchart 200, according to embodiments. Flowchart 400 may follow from step 202 in flowchart 200, described above.

In step 402, an intermediate representation for a query is generated that is associated with a keyword specified in the query. For instance, with reference to FIG. 3, intermediate representation generator 302 may be configured to generate an intermediate representation for a query that is associated with a keyword specified in the query. The keyword may include any one or more words of a programming language of the query that are reserved for performing one or more operations (e.g., database operations). Examples include, but are not limited to, keywords such as WHERE, PARSE, EXTEND, SELECT, etc. Intermediate representation generator 302 may extract, for each query in queries 106, each keyword present in the text of the query, and store an indication of the keyword in a listing (e.g., a table). If multiple keywords are present in a query, each keyword may be stored in a separate row of the listing. This process may be performed for each keyword present in text of a given query, and repeated for each query in queries 106.

In step 404, an intermediate representation for a query is generated that is associated with a function specified in the query. For instance, with reference to FIG. 3, intermediate representation generator 302 may be configured to generate an intermediate representation for a query that is associated with a function specified in the query. The function may include any set of statements (e.g., a collection of code) to perform a task (e.g., a data operation). In implementations, a function may accept input parameters, perform a specified function, and return the output. The function may comprise a predetermined function (e.g., a pre-written function) or a user-defined function. Examples of such functions include, but are not limited to, AVERAGE, COUNT, LAST, etc. in an SQL server environment. Intermediate representation generator 302 may extract, for each query in queries 106, each function present in the text of the query, and store an indication of the function in a listing (e.g., a table). If multiple functions are present in a query, each function may be stored in a separate row of the listing. This process may be performed for each function present in text of a given query, and repeated for each query in queries 106.

In step 406, an intermediate representation for a query is generated that is associated with a data source specified in the query. For instance, with reference to FIG. 3, intermediate representation generator 302 may be configured to generate an intermediate representation for a query that is associated with a data source specified in the query. The data source specified in the query may identify any source of data (e.g., a name or identifier of the data source) that may be accessed during execution of the query. For instance, if two queries reference the same data source, it may be inferred that both queries have at least some similarity with respect to the data being relied upon during execution of the queries. Similar to steps 402 and 404, intermediate representation generator 302 may extract, for each query in queries 106, each data present in the text of the query, and store an indication of the data in a listing. If multiple data sources are present in a query, each data source may be stored in a separate row of the listing. This process may be performed for each data source present in text of a given query, and repeated for each query in queries 106.

In some further implementations, intermediate representation generator 302 may also store an indication, in a row of the listing, of whether the data source is part of the final schema in addition to the name of the data source. In other words, an indication may be stored whether data of the accessed data source is present in the results returned upon execution of the query (e.g., by storing a flag or the like). In some implementations, an identification of the data (e.g., which columns) of the data source present in the final schema may also be identified and stored in a row of the listing.

In the above matter, each row may identify different aspects of the query (e.g., keywords, functions, and/or data source information) that collectively, may define a structure of the query at a higher level representation than the text of the query itself.

On completion of one or more optional steps for flowchart 400, the flow of flowchart 200 may proceed to step 206. It should be noted that while three optional steps are provided for flowchart 400, this set of steps is not to be considered exclusive for the embodiments herein, and further that optional steps performed may be selected based on any other generation of an intermediate representation associated with other text specified in a query.

Turning now to FIG. 5, a flowchart 500 of a method for performing an action based on an indication of an overlapping data set is shown, in accordance with an example embodiment. System 100 in FIG. 1 and/or system 300 in FIG. 3, e.g., via query similarity system 118, operate according to flowchart 500. Further structural and operational examples will be apparent to persons skilled in the relevant art(s) based on the following descriptions.

Flowchart 500 includes a step 502, which includes a step 504 and a step 506. One or more of step 502 and step 506 may be optionally performed to execute step 502 of flowchart 500, according to embodiments. Flowchart 500 may follow from step 210 in flowchart 200, described above.

In step 502, an action is performed based on the indication. For instance, with reference to FIG. 3, similarity determiner 310 may be configured to perform at least on action based on indication 316 that data sets associated with overlapping query pair 314 are overlapping. Various types of actions are contemplated herein, including any one or more of the actions described below in step 504 and step 506.

In step 504, sets of data corresponding to the queries of the pair of intermediate representations that are overlapping are identified to a deduplication system. For instance, with reference to FIGS. 1 and 3, similarity determiner 310 may be configured to provide indication 316 that identifies sets of data corresponding to overlapping query pair 314 to deduplication system 120. In some examples, similarity determiner 310 may identify a plurality of such indications for different overlapping data sets, along with a rank of each one based at least on their associated similarity scores, such that deduplication system 120 may prioritize which data sets should be deduplicated first.

In some implementations, deduplication system 120 need not execute a deduplication algorithm across all data sets 108 to identify duplicated data. Rather, since query similarity system 118 may identify a subset of data sets that are similar (and therefore at least partially overlapping), deduplication system 120 may execute an appropriate deduplication algorithm on only the subset of data sets, resulting in a computational improvement.

In step 506, a notification is provided to an author of at least one of the queries of the pair of intermediate representation s that are overlapping. For instance, with reference to FIG. 3, similarity determiner 310 may be configured to provide indication 316 to an author of at least one of the queries of overlapping query pair 314 indicating, for instance, that the author has defined a query that resulted in a data set that is potentially similar or the same to another data set in ML feature store 104. In some implementations, the indication may also identify the other query not written by the author such that the author can determine whether an overlap exists or delete the query (and associated data set) defined by the author.

It should be noted that while optional steps are provided for flowchart 500, this set of steps is not to be considered exclusive for the embodiments herein, and further that optional steps performed may be selected based on other actions that may be taken in response to an indication that data sets are overlapping.

FIG. 6 shows an illustrative table 600 depicting similarity scores associated with pairs of queries, in accordance with an example embodiment. In FIG. 6, the table comprises a first query 602 designated as $q_1$, a second query 604 designated as $q_2$, and a similarity score 606 designated as $s(Q_1, Q_2)$. The first query $q_1$ and second query $q_2$ indicate a pair of queries of the set of queries 106. Similarity score 606 identifies the corresponding similarity score for the pair of queries, where $Q_1$ represents an intermediate representation of $q_1$, and $Q_2$ represents an intermediate representation of $q_2$. In examples, the rows may be ranked by similarity score, such that query pairs with a higher similarity score may be prioritized for deduplication over query pairs with a lower similarity score.

The arrangement shown in FIG. 6 is illustrative only, and other forms of identifying and/or organizing similarity scores for pairs of queries are contemplated. For instance, information shown in FIG. 6 need not be presented in the form of a table, but may take any other suitable arrangement as will be appreciated by those skilled in the relevant art.

III. Further Description of and Additional Query Similarity Embodiments

The following sections are intended to further describe the above example embodiments and describe additional example embodiments in which implementations may be provided. Furthermore, the sections that follow explain additional context for such example embodiments and details relating to the implementations. The sections that follow are intended to illustrate various aspects and/or benefits that may be achieved based on techniques described herein, and are not intended to be limiting. Accordingly, while additional example embodiments are described, it is understood that the features described below are not required in all implementations.

In example query similarity embodiments, techniques may be implemented by or in one or more of repository 102, ML feature store 104, queries 106, data sets 108, computing device 110, querying system 112, network 114, server 116, query similarity system 118, deduplication system 120, intermediate representation generator 302, weighing algorithm 304, intermediate representation 306, similarity determiner 310, similarity scores 312, overlapping query pair 314, table 600, and/or in connection with any steps of flowcharts 200, 400, and/or 500. Other structural and operational implementations will be apparent to persons skilled in the relevant art(s) based on the following discussion.

As noted above, feature stores are becoming increasingly popular in ML environments. Such environments include environments in which ML operations (also referred to as MLOps) products are implemented. MLOps includes any set of products, software, or techniques in which machine-learning models are trained, designed, maintained, and/or deployed. In connection with MLOps products, many organizations have implemented feature stores as part of their respective ML workbenches or MLOps product suites.

Rather than the traditional way of each data scientist writing data queries (e.g., SQL queries) to fetch data, in the "feature store" environments, data scientists fetch the required features from feature stores. Feature stores provide the advantages of common feature definition (e.g., usage of the same semantics) and amortization of queries of several users, which can preserve compute resources. Other advantages may also be achieved with implementation of feature stores not expressly described herein. For these reasons, feature stores are becoming increasingly popular.

In feature store environments, given that data scientists create queries in multiple ways, there is a chance of duplication of queries. For instance, new features may be added each day or week by users (e.g., data scientists, ML engineers, etc.), making deduplication efforts challenging (e.g., by having a team look at every feature, run the SQL and determine duplication of features).

Techniques described herein relate to systems, methods, and computer-readable storage mediums for determining approximate query equivalence for features in a feature store in a programmatic fashion. The disclosed techniques do not to run the queries on the database to find out their equivalence and may allow for various advantages (e.g., by reducing memory and/or processor usage, improving a carbon footprint, etc.). In particular, techniques described herein allow for a comparison of queries as proxies to identify duplicated data, and allows for a more efficient search from both a memory and computational standpoint. Rather than analyzing data that can be voluminous (e.g., the features themselves), disclosed techniques analyze queries, which typically may comprise smaller text files (e.g., containing SQL or other code), that were used to generate the features. Furthermore, techniques allow for identification of queries that are not only identical but also similar (e.g., as an approximate equivalent or match), thereby enabling features that are similar to be identified.

In order to define a similarity score $s(q_1, q_2)$ between pairs of queries, query representation generator 302 may extract queries from a repository and lift queries from their raw text form to build an intermediate higher-level representation for each query that abstracts away syntax specific details. Similar, or even equivalent queries may superficially look different from each other based on their raw text form due to the different syntax data scientists use or because of other performance optimization techniques data engineers may use. This intermediate representation helps in characterizing each query by the following set of illustrative, and non-limiting, features.

Part 1: Intermediate Representations. Features of an intermediate representation may include keywords (e.g., SELECT, FROM, JOIN, GROUP BY, etc. in SQL) and/or functions (e.g., AVG( ), COUNT( ), LAST( ), etc. in SQL). These are provided only as an illustration, as other query languages may have different keywords. In general, keywords and functions may comprise a backbone that collectively define the logic of how features and new datasets are built. Therefore, each query q can be characterized by a set of keyword and function related features represented as a table with the schema:

(q, keyword)
(q, function)

In examples, each query may comprise as many rows as there are distinct keywords and/or functions present in the query. If a keyword or function appears more than once in the same query, those instances may be recorded as multiple rows. For this reason, it may be noted how many times keywords and/or functions appear in the queries.

In addition to the keywords and/or functions, queries may also depend on actual data sources where the underlying data resides. For example, in SQL, data sources correspond to the names of the databases, tables, and/or columns. Discloses techniques take into account data source dependencies as part of the intermediate representation generated by intermediate representation generator 302. In some examples, intermediate representation generator 302 may automatically extract one or more of the data sources a query depends on using tools such as a dependency map as a service. Where two queries use the same data sources, they are more likely to result in data sets that are similar. In the context of relational databases, for instance, there is a hierarchical structure defining how data sources are organized: tables are entities hosted by databases and columns are lower-level entities which are hosted by the tables. Other data models have other database specific structure but the hierarchical nature is generic. Therefore, each query q can be characterized by an additional set of data source dependency related features with the schema:

(q, name of data source, flag indicating if this data source is part of the final schema of q)

Each query may be associated with as many rows as there are data sources present in the query. It is also possible for the same data source to appear more than once in the same query. In this case, that data source may appear as multiple rows, so it may be noted how many times data sources are referenced in the queries.

Part 2: Query Similarity. Consider a pair of queries $q_1$ and $q_2$ that have been lifted into the intermediate representation as described herein. All of the rows (features) that refer to data dependencies, keywords, and/or functions of $q_1$ and $q_2$ may be concatenated together into two vectors $Q_1$ and $Q_2$:

$$Q_1 = \left(q_1, 1^{st} \text{ data source for } q_1, \dots, n_{q_1}^{data} \text{ data source for } q_1,\right.$$
$$1^{st} \text{ keyword for } q_1, \dots, n_{q_1}^{keywords} \text{ keyword for } q_1,$$
$$\left.1^{st} \text{ function for } q_1, \dots, n_{q_1}^{functions} \text{ function for } q_1\right)$$
$$Q_2 = \left(q_2, 1^{st} \text{ data source for } q_2, \dots, n_{q_2}^{data} \text{ data source for } q_2,\right.$$
$$1^{st} \text{ keyword for } q_2, \dots, n_{q_2}^{keywords} \text{ keyword for } q_2,$$
$$\left.1^{st} \text{ function for } q_2, \dots, n_{q_2}^{functions} \text{ function for } q_2\right)$$

As mentioned herein, the same features (components of the $Q_1$ and $Q_2$ vectors) may appear multiple times in the same query. This can be understood by considering hierarchical relational models. Data sources that appear at the top level of the hierarchy (such as the name of a database) are very likely to be present in all queries. As a result, their presence in both $q_1$ and $q_2$ does not necessarily mean that $q_1$ and $q_2$ are truly similar to each other. The same may go for common keywords and functions (such as SELECT keywords in SQL queries). On the other hand, features that are relatively rare across the whole body of $n_q$ queries in the feature store (such as unusual and/or very specific data sources) may be a good indicator of similarity if they happen to appear simultaneously in both $q_1$ and $q_2$.

Accordingly, in implementations, intermediate representation generator 302 may create an intermediate representation for each query of the form <Data Source, Table name, column name, Keyword, Function> (in no particular order), where data sources can comprise clusters or database names, tables refer to the table names, column names refer to the columns of the tables, keywords refer to SQL constructions like SELECT, DROP, INSERT, DELETE, etc., and functions refer to SQL constructs like COUNT, DCOUNT, SUM, MIN, MAX, etc.

In implementations, intermediate representation generator 302 may be configured to assign different weights to the features of two vectors $Q_1$ and $Q_2$ using a TFIDF weighting scheme. Term frequency (TF) considers the importance of a feature in a given query whereas inverse document frequency (IDF) measures the importance of a feature with respect to the entire corpus of queries in the feature store. Combining TF and IDF together allows intermediate representation generator 302 to assign importance weights to all the features, and the vector intermediate representations $Q_1$ and $Q_2$ are transformed into two sets of features with TFIDF weights. Denoting by w a vectorized function that performs this weighting transformation (e.g., $Q \rightarrow w(Q)$), the original queries may be lifted into $q_1 \rightarrow w(Q_1)$ and $q_2 \rightarrow w(Q_2)$ where $w(Q_1)$ and $w(Q_2)$ correspond to sets where each component encodes (as a scalar value) the importance weight associated with all distinct features of $Q_1$ and $Q_2$.

At this point, similarity determiner 310 may create all pair of queries $(q_1, q_2)$, and measure a set of similarity of their representations $(Q_1, Q_2)$. The similarity may be measured by utilizing similarity metric functions such as cosine similarity, BM25, a weighed Jaccard coefficient, minHash, or other locally sensitive hashing functions in order to compute the similarity $s(q_1, q_2)$ between $q_1$ and $q_2$. While the term similarity score is used herein, it should be understood that the similarity score refers to a query equivalence metric, which may comprise a measure of approximate equivalence of two queries. In case the number of queries $n_q$ is very large, similarity determiner 310 may resort to faster but approximate locality sensitive hashing algorithms such as MinHash in order to estimate $s(q_1, q_2)$. While the similarity is denoted as $s(q_1, q_2)$, it should be understood that the similarity may also be denoted as $s(Q_1, Q_2)$ (e.g., similarity based on the intermediate representation corresponding to each query).

In any case, the end result of this procedure may comprise a table (e.g., as shown in FIG. 6) with the schema $[q_1, q_2, s(q_1, q_2)]$ where rows are ordered according to $s(q_1, q_2)$. Query pairs $q_1$ and $q_2$ which are associated with the highest similarity scores form the list of candidates that are most likely to generate duplicated features and/or closely related datasets.

By quantifying the similarity $s(q_1, q_2)$ of the pairs of source code queries, a list of candidate queries which have a high likelihood of generating duplicated features and/or closely related datasets may be identified. A similarity score $s(q_1, q_2) \approx 1$ indicates that $q_1$ and $q_2$ are highly similar to each other and therefore that $q_1(D) \approx q_2(D)$. On the other hand, a score $s(q_1, q_2) \approx 0$ suggests that $q_1$ and $q_2$ generate sufficiently different datasets such that $q_1(D) \neq q_2(D)$. For every pair of queries in the feature store, a table with the schema $[q_1, q_2, s(q_1, q_2)]$ may be produced.

Queries with high similarity score are good candidates for deduplication efforts (e.g., via deduplication system 120 and/or based on an analysis from one of the query authors). Given $n_q$ queries in the feature store, the number of rows grows as $n_q^2$ but each score $s(q_1, q_2)$ can be calculated independently of each other so that multiprocessing and/or distributed computed techniques may be used when $n_q$ is large.

The disclosed techniques relating to achieving approximate feature equivalence programmatically has numerous advantages, some of which are described elsewhere herein. One such advantage is the ability to examine queries rather than examining an output of a query run to determine feature equivalence (or approximate equivalence). For instance, disclosed techniques take into account the separation between how the features are specified (e.g., text source code written in a query programming language) versus how the data generated therefrom is actually stored on the disk (e.g., bytes on disk). Instead of traditional data deduplication approaches where queries are executed in a data dependent manner on the data itself (which is often voluminous), disclosed techniques rely on a higher-level abstract representation of the data (e.g., an intermediate representation). Because duplicated data is generated by duplicated queries, identification of queries that are equivalent may be performed to identify duplicated data sets, without having to having to separately execute and store the output of those queries. Accordingly, considering data duplication not at the data level but rather at the level of the upstream queries that are used to generate the data may lead to various types of memory and processor efficiencies, which can be beneficial in a number of environments such as in real-world environments involving sophisticated production-grade ML queries.

Another advantage is the ability to determine an approximate match in addition to an exact match. For instance, disclosed techniques enable the identification of approximate matches. For instance, if two queries are similar to each other (e.g., based on similarity scores), those queries may end up generating datasets that are also be similar to each other. As a result, deduplication is not limited to identifying only exact data matches, but can broadly identify similar data sets such that similar data may also be deduplicated (which can further preserve memory resources). These advantages are not intended to be limiting, and other benefits and advantages are described elsewhere herein and/or should be appreciated by those skilled in the relevant art.

IV. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry As noted herein, the embodiments described, including but not limited to, system 100 in FIG. 1 and system 300 in FIG. 3, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 7:
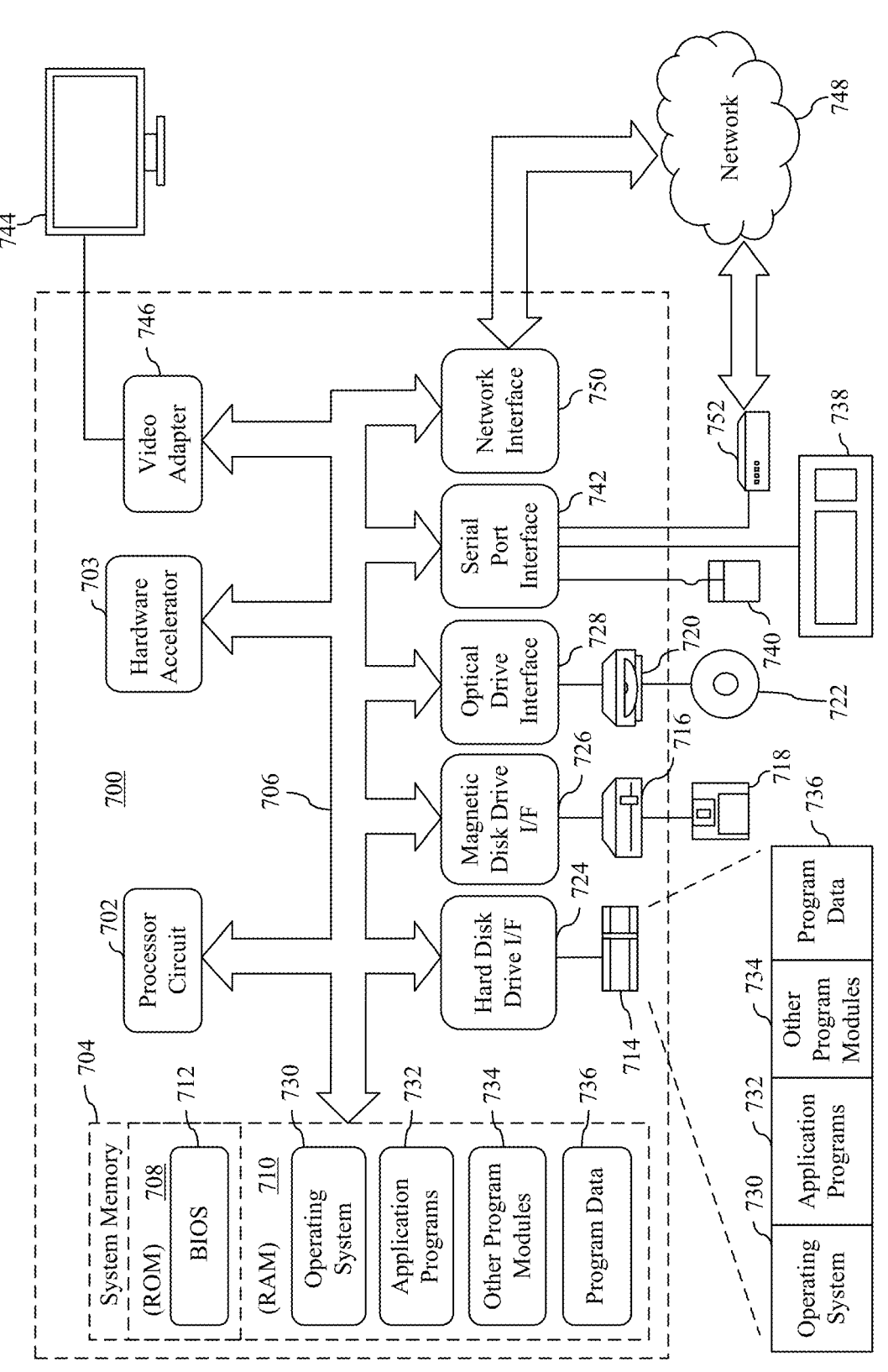
FIG. 7 is a block diagram of an example processor-based computer system that may be used to implement various embodiments.

FIG. 7 depicts an exemplary implementation of a computing device 700 in which embodiments may be implemented. For example, embodiments described herein may be implemented in one or more computing devices or systems similar to computing device 700, or multiple instances of computing device 700, in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, servers, and/or clusters, etc., as would be known to persons skilled in the relevant art(s).

As shown in FIG. 7, computing device 700 includes one or more processors, referred to as processor circuit 702, a hardware accelerator 703, a system memory 704, and a bus 706 that couples various system components including system memory 704 to processor circuit 702 and hardware accelerator 703. Processor circuit 702 and/or hardware accelerator 703 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing embodiments described herein, such as but not limited to, s system 100 in FIG. 1 and system 300 in FIG. 3, along with any components and/or subcomponents thereof, as well as the flowcharts/flow diagrams described herein, including portions thereof, and/or further examples described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with propagating signals and communication media (do not include propagating signals and communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

A system for identifying a similarity between queries is disclosed herein. The system includes: at least one processor circuit; and at least one memory that stores program code configured to be executed by the at least one processor circuit, the program code comprising: an intermediate representation generator configured to: receive a set of queries from a repository, each query in the set of queries having generated a corresponding set of data stored in a data store, and generate an intermediate representation for each query that is characterized by a feature associated with text specified in the query; and a similarity determiner configured to: generate similarity scores between pairs of intermediate representations, identify a pair of intermediate representations with a similarity score above a threshold, and generate an indication that sets of data corresponding to queries corresponding to the identified pair of intermediate representations are overlapping.

In one implementation of the foregoing system, the intermediate representation for each query comprises a vector representation.

In another implementation of the foregoing system, the vector representation for each query is characterized by a plurality of weighted features, each weighed feature associated with text specified in the query.

In another implementation of the foregoing system, for at least one query, the feature is associated with a keyword specified in the query.

In another implementation of the foregoing system, for at least one query, the feature is associated with a function specified in the query.

In another implementation of the foregoing system, for at least one query, the feature is associated with a data source specified in the query.

In another implementation of the foregoing system, the data store comprises a feature store, and each corresponding set of data stored in the feature store comprises machine-learning features.

In another implementation of the foregoing system, the similarity determiner is further configured to perform, based on the indication, at least one of: identifying the sets of data corresponding to the queries of the pair of intermediate representations that are overlapping to a deduplication system, or providing a notification to an author of at least one of the queries of the pair of intermediate representations are overlapping.

A method for identifying a similarity between queries is disclosed herein. The method includes: receiving a set of queries from a repository, each query in the set of queries having generated a corresponding set of data stored in a data store; generating an intermediate representation for each query that is characterized by a feature associated with text specified in the query; generating similarity scores between pairs of intermediate representations; identifying a pair of intermediate representations with a similarity score above a threshold; and generating an indication that sets of data corresponding to queries corresponding to the identified pair of intermediate representations are overlapping.

In one implementation of the foregoing method, the intermediate representation for each query comprises a vector representation.

In another implementation of the foregoing method, the vector representation for each query is characterized by a plurality of weighted features, each weighed feature associated with text specified in the query.

In another implementation of the foregoing method, for at least one query, the feature is associated with a keyword specified in the query.

In another implementation of the foregoing method, for at least one query, the feature is associated with a function specified in the query.

In another implementation of the foregoing method, for at least one query, the feature is associated with a data source specified in the query.

In another implementation of the foregoing method, the data store comprises a feature store, and each corresponding set of data stored in the feature store comprises machine-learning features.

In another implementation of the foregoing method, the method further comprises performing, based on the indication, at least one of: identifying the sets of data corresponding to the queries of the pair of intermediate representations that are overlapping to a deduplication system, or providing a notification to an author of at least one of the queries of the pair of intermediate representations are overlapping.

A computer-readable storage medium is disclosed herein. The computer-readable storage medium has computer program code recorded thereon that when executed by at least one processor causes the at least one processor to perform a method comprising: receiving a set of queries from a repository, each query in the set of queries having generated a corresponding set of data stored in a data store; generating an intermediate representation for each query that is characterized by a feature associated with text specified in the query; generating similarity scores between pairs of intermediate representations; identifying a pair of intermediate representations with a similarity score above a threshold; and generating an indication that sets of data corresponding to queries corresponding to the identified pair of intermediate representations are overlapping.

In one implementation of the foregoing computer-readable storage medium, for at least one query, the feature is associated with a keyword specified in the query.

In another implementation of the foregoing computer-readable storage medium, for at least one query, the feature is associated with a function specified in the query.

In another implementation of the foregoing computer-readable storage medium, for at least one query, the feature is associated with a data source specified in the query.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for deduplicating data in a data store, comprising:

a processor; and a memory that stores program code structured to cause the processor to:

generate an intermediate representation for each of a first query and a second query, each intermediate representation comprising multiple dimensions, each dimension corresponding to a weighted feature of the query, the first query having generated a first set of data in the data store and the second query having generated a second set of data in the data store;

generate a similarity score between the intermediate representation for the first query and the intermediate representation for the second query; and remove one of the first set of data or the second set of data in the data store based at least on the similarity score.

2. The system of claim 1, wherein the intermediate representation for each query comprises a vector representation.

3. The system of claim 1, wherein for the first query, one of the weighted features is associated with text specified in the first query.

4. The system of claim 1, wherein for the first query, one of the weighted features is associated with a keyword specified in the first query.

5. The system of claim 1, wherein for the first query, one of the weighted features is associated with a function specified in the first query.

6. The system of claim 1, wherein for the first query, one of the weighted features is associated with a data source specified in the first query.

7. The system of claim 1, wherein the first set of data and the second set of data comprise machine-learning features.

8. The system of claim 1, wherein the program code is further structured to cause the processor to:

provide a notification to an author of at least one of the first query or the second query indicating that the first query and the second query are overlapping.

9. A method for deduplicating data in a data store, comprising:

generating an intermediate representation for each of a first query and a second query, each intermediate representation comprising multiple dimensions, each dimension corresponding to a weighted feature of the query, the first query having generated a first set of data in the data store and the second query having generated a second set of data in the data store;

generating a similarity score between the intermediate representation for the first query and the intermediate representation for the second query; and removing one of the first set of data or the second set of data in the data store based at least on the similarity score.

10. The method of claim 9, wherein the intermediate representation for each query comprises a vector representation.

11. The method of claim 9, wherein for the first query, one of the weighted features is associated with a keyword specified in the first query.

12. The method of claim 9, wherein for the first query, one of the weighted features is associated with a function specified in the first query.

13. The method of claim 9, wherein for the first query, one of the weighted features is associated with a data source specified in the first query.

14. The method of claim 9, wherein the first set of data and the second set of data comprise machine-learning features.

15. The method of claim 9, further comprising:

providing a notification to an author of at least one of the first query or the second query indicating that the first query and the second query are overlapping.

16. A computer-readable storage medium having computer program code recorded thereon that when executed by at least one processor causes the at least one processor to perform a method comprising:

generating an intermediate representation for each of a first query and a second query, each intermediate representation comprising multiple dimensions, each dimension corresponding to a weighted feature of the query, the first query having generated a first set of data in the data store and the second query having generated a second set of data in the data store;

generating a similarity score between the intermediate representation for the first query and the intermediate representation for the second query; and removing one of the first set of data or the second set of data in the data store based at least on the similarity score.

17. The computer-readable storage medium of claim 16, wherein the intermediate representation for each query comprises a vector representation.

18. The computer-readable storage medium of claim 16, wherein for the first query, one of the weighted features is associated with a keyword specified in the first query.

19. The computer-readable storage medium of claim 16, wherein for the first query, one of the weighted features is associated with a function specified in the first query.

20. The computer-readable storage medium of claim 16, wherein for the first query, one of the weighted features is associated with a data source specified in the first query.

* * * * *